(12) United States Patent
Blake

(10) Patent No.: US 6,752,404 B1
(45) Date of Patent: Jun. 22, 2004

(54) BRAKE-OPERATED DOLLY

(76) Inventor: Eva E. Blake, 115 Sagamore Ave., #3, Chelsea, MA (US) 02150

( * ) Notice: Subject to any disclaimer, the term of this patent is extended or adjusted under 35 U.S.C. 154(b) by 21 days.

(21) Appl. No.: 10/196,471

(22) Filed: Jul. 16, 2002

(51) Int. Cl.[7] .................................................. B62B 5/04
(52) U.S. Cl. ....................... 280/47.27; 188/19; 188/22
(58) Field of Search .......................... 280/47.27, 47.24, 280/47.25, 47.17, 47.28; 188/19, 22, 21, 29, 329, 330, 9, 10, 11, 20

(56) References Cited

U.S. PATENT DOCUMENTS

| | | | | |
|---|---|---|---|---|
| 1,701,188 A | * | 2/1929 | Miller | 188/22 |
| 3,276,550 A | * | 10/1966 | Honeyman | 188/29 |
| 3,486,587 A | * | 12/1969 | Malloy | 188/22 |
| 3,941,399 A | * | 3/1976 | Peters et al. | 280/47.29 |
| 3,945,472 A | * | 3/1976 | Peters et al. | 188/72.7 |
| 3,968,974 A | * | 7/1976 | Wetzel | 280/47.27 |
| 4,819,767 A | * | 4/1989 | Laird | 188/2 D |
| 4,974,862 A | * | 12/1990 | Maupin | 280/47.27 |
| 5,390,943 A | * | 2/1995 | Hedrick | 280/47.24 |
| 5,393,081 A | * | 2/1995 | Mortenson | 280/47.27 |
| 5,433,464 A | * | 7/1995 | Hlebakos | 280/47.27 |
| 5,524,731 A | * | 6/1996 | Grieg | 188/19 |
| 5,531,295 A | * | 7/1996 | Kopman et al. | 188/21 |
| 5,799,959 A | * | 9/1998 | Krawczyk | 280/47.27 |
| 5,947,491 A | * | 9/1999 | Meier | 281/47.2 |
| 6,039,332 A | * | 3/2000 | Austin | 280/47.17 |
| 6,216,825 B1 | * | 4/2001 | Hung | 188/24.22 |

* cited by examiner

Primary Examiner—Brian L. Johnson
Assistant Examiner—J. Allen Shriver

(57) ABSTRACT

A brake-operated dolly for controlling the use of a dolly especially on sloped surfaces. The brake-operated dolly includes a dolly having side rails, cross members, wheels, and handles; and also includes a pair of brake support members being securely attached to the side rails and above the wheels of the dolly; and further includes a pair of brake members being pivotally mounted to the brake support members and being engagable to the wheels of the dolly; and also includes a brake actuating assembly including a pair of bracket members being securely attached to the side rails near the handles of said dolly, and also including an elongate brake actuator having ends journaled through the bracket members, and further including cables being connected to the brake members for the actuation thereof.

10 Claims, 4 Drawing Sheets

BRAKE-OPERATED DOLLY

BACKGROUND OF THE INVENTION

1. Field of the Invention

The present invention relates to brake-operated dollies and more particularly pertains to a new brake-operated dolly for controlling the use of a dolly especially on sloped surfaces.

2. Description of the Prior Art

The use of brake-operated dollies is known in the prior art. More specifically, brake-operated dollies heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,276,550; U.S. Pat. No. 4,819,767; U.S. Pat. No. 5,524,731; U.S. Pat. No. 3,968,974; U.S. Pat. No. 5,433,464; U.S. Pat. No. 5,390,943; and U.S. Pat. No. Des. 364,022.

While these devices fulfill their respective, particular objectives and requirements, the aforementioned patents do not disclose a new brake-operated dolly. The prior art describes inventions including levers and wheel engagement members being operated by the levers.

SUMMARY OF THE INVENTION

The general purpose of the present invention, which will be described subsequently in greater detail, is to provide a new brake-operated dolly which has many of the advantages of the brake-operated dollies mentioned heretofore and many novel features that result in a new brake-operated dolly which is not anticipated, rendered obvious, suggested, or even implied by any of the prior art brake-operated dollies, either alone or in any combination thereof. The present invention includes a dolly having side rails, cross members, wheels, and handles; and also includes a pair of brake support members being securely attached to the side rails and above the wheels of the dolly; and further includes a pair of brake members being pivotally mounted to the brake support members and being engagable to the wheels of the dolly; and also includes a brake actuating assembly including a pair of bracket members being securely attached to the side rails near the handles of said dolly, and also including an elongate brake actuator having ends journaled through the bracket members, and further including cables being connected to the brake members for the actuation thereof. None of the prior art describes scissors-like brake members which are engagable to the wheels of the dolly.

There has thus been outlined, rather broadly, the more important features of the brake-operated dolly in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new brake-operated dolly which has many of the advantages of the brake-operated dollies mentioned heretofore and many novel features that result in a new brake-operated dolly which is not anticipated, rendered obvious, suggested, or even implied by any of the prior art brake-operated dollies, either alone or in any combination thereof.

Still another object of the present invention is to provide a new brake-operated dolly for controlling the use of a dolly especially on sloped surfaces.

Still yet another object of the present invention is to provide a new brake-operated dolly that is easy and convenient to use.

Even still another object of the present invention is to provide a new brake-operated dolly that substantially lessens the possibility of injury to the users of dollies.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
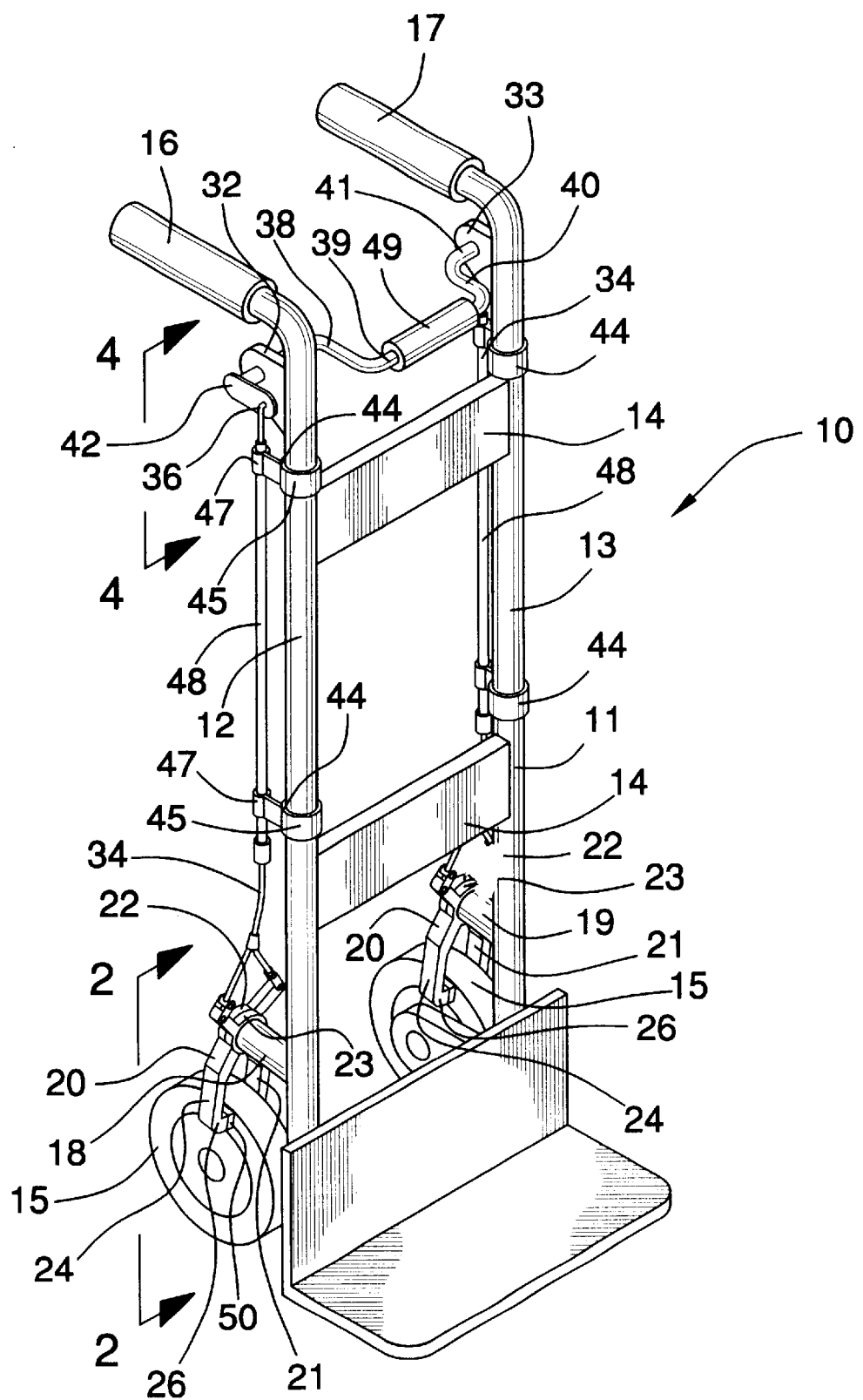
FIG. 1 is a perspective view of a new brake-operated dolly according to the present invention and shown in use.
Figure 2:
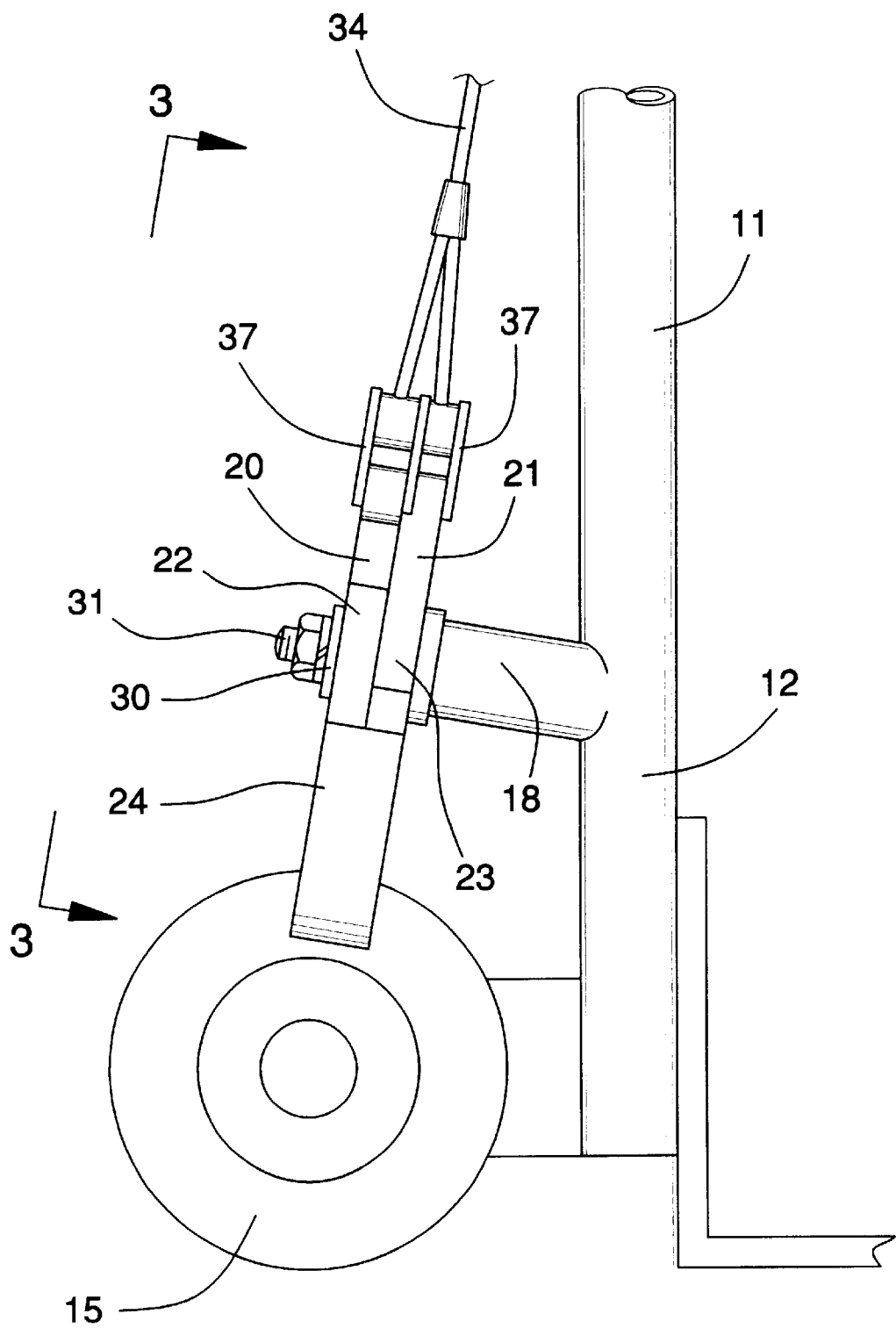
FIG. 2 is a partial side elevational view of the present invention.
Figure 3:
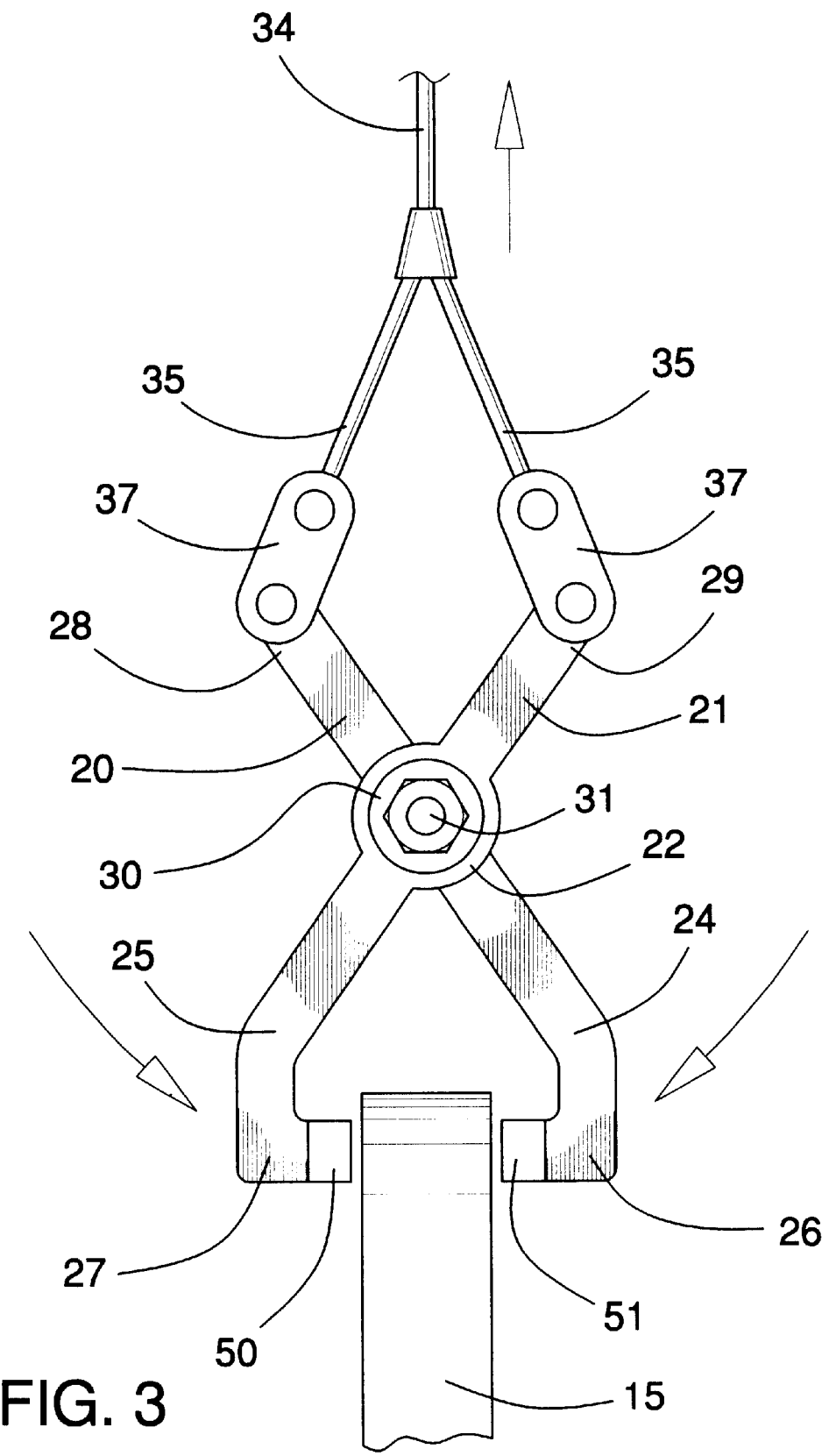
FIG. 3 is a detailed rear elevational view of one of the brake members of the present invention.
Figure 4:
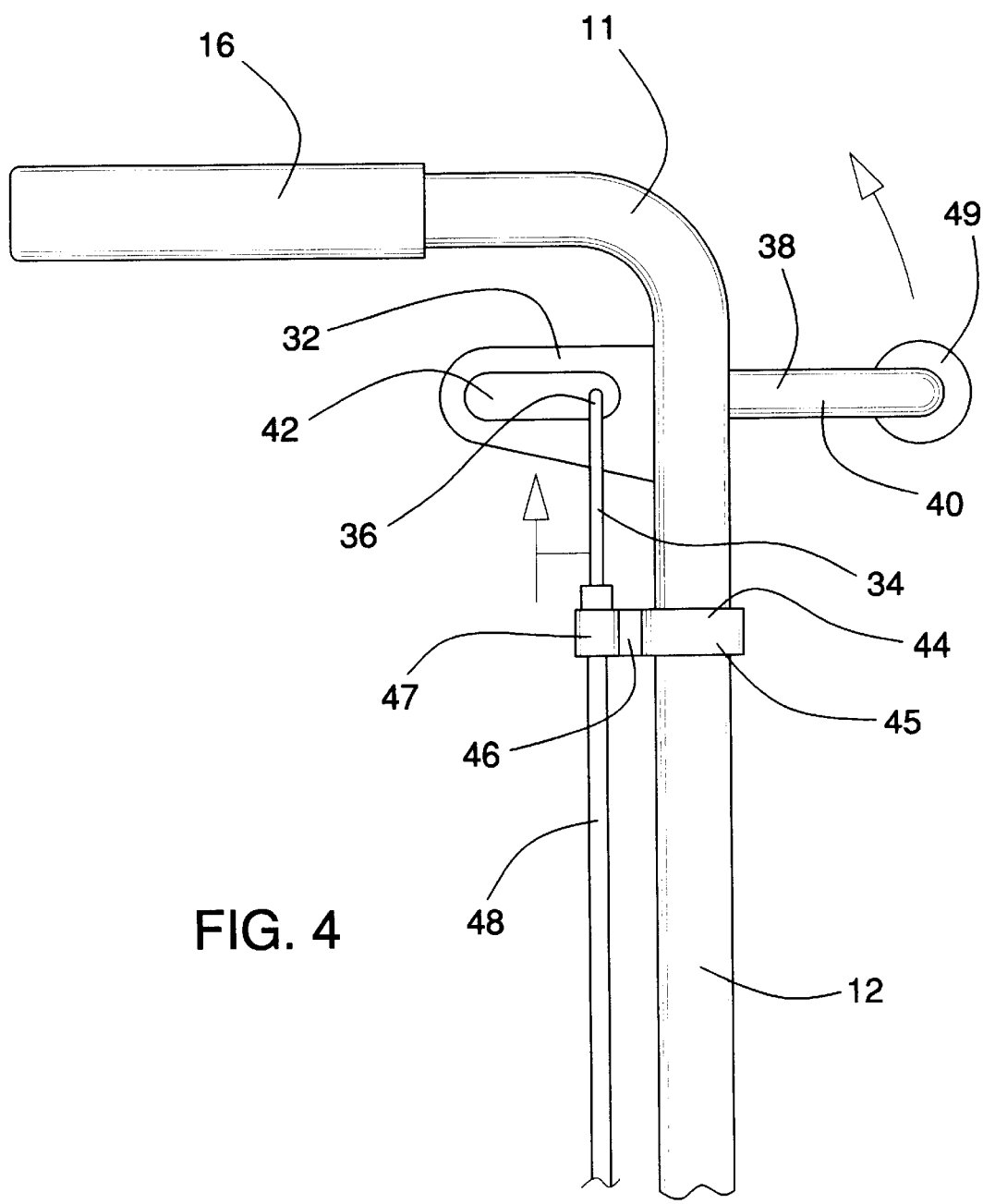
FIG. 4 is a detailed side elevational view of the brake actuating assembly of the present invention.

With reference now to the drawings, and in particular to FIGS. 1 through 4 thereof, a new brake-operated dolly embodying the principles and concepts of the present invention and generally designated by the reference numeral 10 will be described.

As best illustrated in FIGS. 1 through 4, the brake-operated dolly 10 generally comprises a dolly 11 having side rails 12,13, cross members 14, wheels 15, and handles 16,17. A pair of brake support members 18,19 are securely and conventionally attached and welded to the side rails 12,13 and above the wheels 15 of the dolly 11. Each of the brake support members 18,19 is a cylindrical member which has an end which is securely attached and welded to a respective side rail 12,13 and which extends outwardly therefrom above a respective wheel 15.

A pair of brake members are pivotally mounted to the brake support members 18,19 and are engagable to the wheels 15 of the dolly 11. Each of the brake members includes a pair of arms 20,21 having centrally-disposed ring portions 22,23 and also having jaw portions 26,27 for engaging the wheels 15 and further having pad members 50,51 being conventionally attached at ends of the jaw portions 50,51. The arms 20,21 are mounted to a respective brake support member in a scissors-like arrangement with the jaw portions 26,27 being opposed to one another and being movable toward and away from one another and being engagable to opposite sides of a respective wheel 15. The ring portions 22,23 are pivotally and securely mounted about the brake support members 18,19 with washers 30 and fasteners 31. Each of the arms 20,21 has an elongate main portion, and also has a first end portion 24,25 which is angled relative to the elongate main portion with each of the jaw portions 26,27 being angled relative to a respective first end portion 24,25.

A brake actuating assembly includes a pair of bracket members 32,33 being securely and conventionally attached and welded to the side rails 12,13 near the handles 16,17 of the dolly 11, and also includes an elongate brake actuator 38 having ends journaled through the bracket members 32,33, and further includes cables 34 being conventionally connected to the brake members for the actuation thereof. The cables 34 have first ends 35 which are conventionally connected with connectors 37 to second ends 28,29 of the arms 20,21. The brake actuating assembly further includes linkages 42 being conventionally attached to ends of the elongate brake actuator 38. The cables 34 have second ends 36 which are securely and conventionally attached to the linkages 42. The elongate brake actuator 38 has an elongate intermediate portion 39 and end portions 40,41 which are angled relative to the elongate intermediate portion 39. Each of the end portions 40,41 includes a first portion 40 being integrally attached to and angled approximately 90 degrees relative to the elongate intermediate portion 39, and also includes a second portion 41 which is integrally attached to and angled approximately 90 degrees relative to the first portion 40. The brake actuating assembly further includes cable support brackets 44 being securely and conventionally attached to the side rails 12,13 of the dolly 11, and also includes elongate tubular support members 48 being conventionally attached to the cable support brackets 44 with the cables 34 being extended through the elongate tubular support members 48. Each of the cable support brackets 44 includes a first ring portion 45 being conventionally mounted about a respective side rail 12,13, and also includes a linkage portion 46 being integrally attached to the first ring portion 45, and further includes a second ring portion 47 being integrally attached to the linkage portion 46 and through which a respective elongate tubular support member 48 is conventionally attached. The brake actuating assembly also includes a padded sleeve 49 being disposed about the elongate intermediate portion 39 of the brake actuator member 38.

In use, the user grasps the padded sleeve 49 and rotates the elongate brake actuator 38 to effect movement of the brake members. To close the jaw portions 26,27 about the wheels 15, the user will rotate the elongate brake actuator 38 in one direction, and to open the jaw portions 26,27 from about the wheels 15, the use will rotate the elongate brake actuator 38 in the opposite direction. The brake members prevent the dolly 11 from moving without user intervention.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the brake-operated dolly. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A brake-operated dolly comprising:

a dolly having side rails, cross members, wheels, and handles;

a pair of brake support members being securely attached to said side rails and above said wheels of said dolly;

a pair of brake members being pivotally mounted to said brake support members and being engageable to said wheels of said dolly, each of said brake support members being a cylindrical member which has an end which is securely attached to a respective said side rail and which extends outwardly therefrom above a respective said wheel, each of said brake members including a pair of arms having centrally-disposed ring portions and also having jaw portions for engaging said wheels and further having pad members being attached at ends of said jaw portions, said arms being mounted to a respective said brake support member in a scissors-like arrangement with said jaw portions being opposed to one another and being movable toward and away from one another and being engageable to opposite sides of a respective said wheel; and a brake actuating assembly including a pair of bracket members being securely attached to said side rails near said handles of said dolly, and also including an elongate brake actuator having ends journaled through said bracket members, and further including cables being connected to said brake members for the actuation thereof.

2. A brake-operated dolly as described in claim 1, wherein said ring portions are pivotally and securely mounted about said brake support members with washers and fasteners.

3. A brake-operated dolly as described in claim 2, wherein each of said arms has an elongate main portion, and also has a first end portion which is angled relative to said elongate main portion with each of said jaw portions being angled relative to a respective said first end portion.

4. A brake-operated dolly as described in claim 3, wherein said cables have first ends which are connected with connectors to second ends of said arms.

5. A brake-operated dolly as described in claim 4, wherein said brake actuating assembly further includes linkages being attached to ends of said elongate brake actuator, said cables having second ends which are securely attached to said linkages.

6. A brake-operated dolly as described in claim 5, wherein said elongate brake actuator has an elongate intermediate portion and end portions which are angled relative to said elongate intermediate portion.

7. A brake-operated dolly as described in claim 6, wherein each of said end portions includes a first portion being integrally attached to and angled approximately 90 degrees relative to said elongate intermediate portion, and also includes a second portion which is integrally attached to and angled approximately 90 degrees relative to said first portion.

8. A brake-operated dolly as described in claim 7, wherein said brake actuating assembly further includes cable support brackets being securely attached to said side rails of said dolly, and also includes elongate tubular support members being attached to said cable support brackets, said cables being extended through said elongate tubular support members.

9. A brake-operated dolly as described in claim 8, wherein each of said cable support brackets includes a first ring portion being mounted about a respective said side rail, and also includes a linkage portion being integrally attached to said first ring portion, and further includes a second ring portion being integrally attached to said linkage portion and through which a respective said elongate tubular support member is attached.

10. A brake-operated dolly as described in claim 9, wherein said brake actuating assembly also includes a padded sleeve being disposed about said elongate intermediate portion of said brake actuator member.

* * * * *